United States Patent [19]

Dromigny

[11] Patent Number: 4,728,477

[45] Date of Patent: Mar. 1, 1988

[54] PROCESS FOR MANUFACTURING OBJECTS BY INJECTION OF SYNTHETIC MATERIAL AND MACHINE FOR CARRYING OUT SAID PROCESS

[76] Inventor: Pierre Dromigny, 54, avenue de Versailles, 75016 Paris, France

[21] Appl. No.: 885,688

[22] Filed: Jul. 15, 1986

[30] Foreign Application Priority Data

Jan. 13, 1986 [FR] France ................... 86 00367

[51] Int. Cl.$^4$ ............................................. B29C 43/22
[52] U.S. Cl. ................................. 264/509; 264/153; 264/259; 264/334; 425/114; 425/122; 425/126 R; 425/129 R; 425/292; 425/311
[58] Field of Search ............... 425/114, 117, 122, 126, 425/127, 129 R, 289, 292, 310, 311; 264/153, 259, 279, 334, 509

[56] References Cited

U.S. PATENT DOCUMENTS

| | | | |
|---|---|---|---|
| 4,075,266 | 2/1978 | Theysohn | 264/250 |
| 4,335,635 | 6/1982 | Hautemont | 264/509 |
| 4,459,092 | 7/1984 | Hataheyma | 425/292 |
| 4,466,787 | 8/1984 | Ragir et al. | 425/122 |
| 4,545,752 | 10/1985 | Hanamoto et al. | 425/112 |
| 4,686,076 | 8/1987 | Dromigny et al. | 425/127 |

Primary Examiner—Bernard Nozick
Attorney, Agent, or Firm—Fisher, Christen & Sabol

[57] ABSTRACT

This invention relates to a process for manufacturing, by injection of synthetic material, objects comprising a film forming an integral part thereof, by means of an injection machine incorporating a mould comprising a punch and a die, and at least one nozzle for injecting synthetic material, wherein a web of the film material is advanced step by step towards the mould and, after advance of said web by a step corresponding to a certain dimension of the film to be cut out, a film is cut out from said web in the desired format, with the result that the film cut out to the chosen format lies between the punch and the die at the instant when the mould is closed.

6 Claims, 10 Drawing Figures

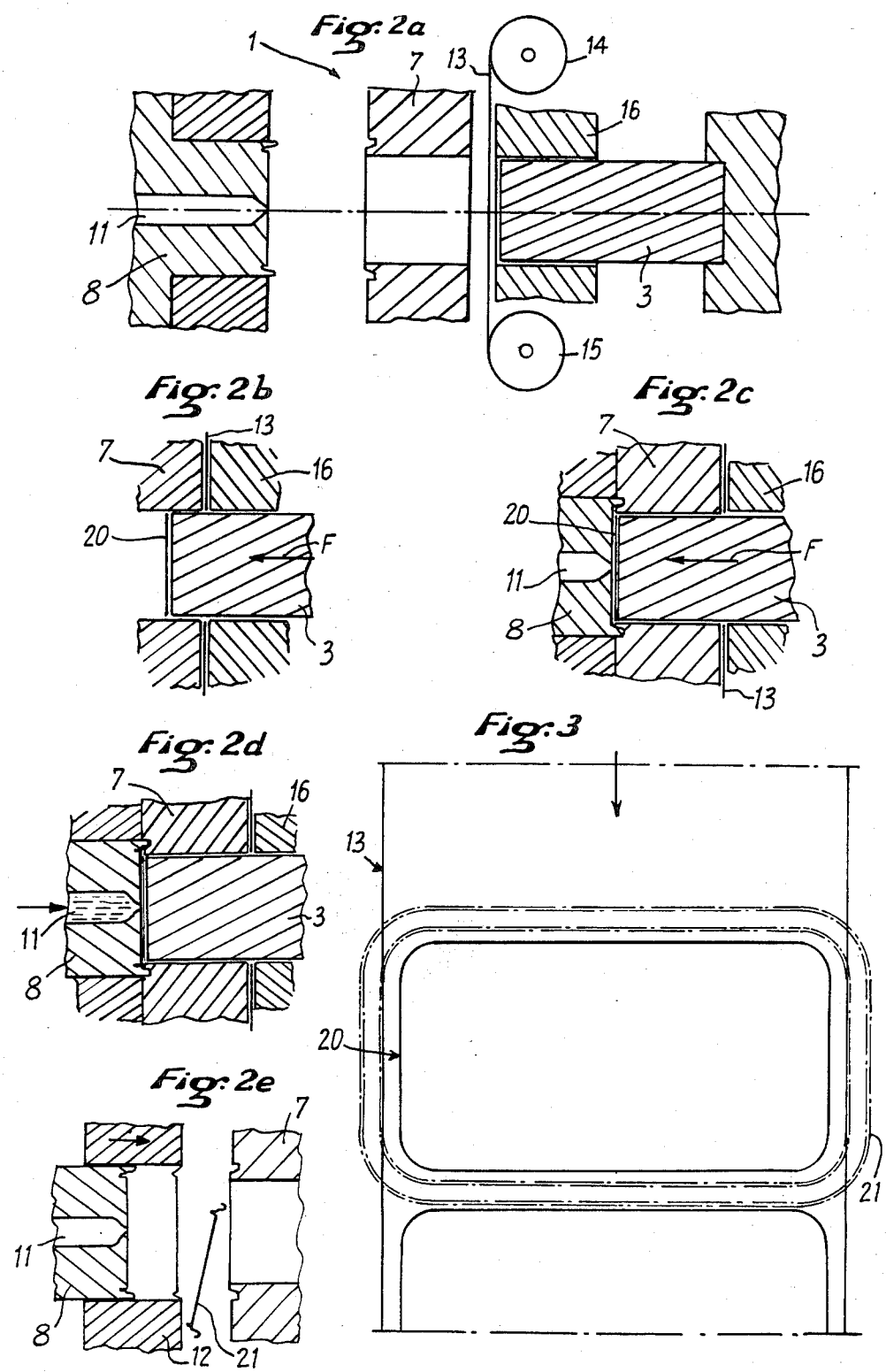

PROCESS FOR MANUFACTURING OBJECTS BY INJECTION OF SYNTHETIC MATERIAL AND MACHINE FOR CARRYING OUT SAID PROCESS

The present invention relates to a process for manufacturing, by injection of synthetic material, objects such as recipients which comprise a film forming an integral part thereof and constituting an at least partial coating of said objects, as well as to a machine for carrying out this process.

Such a process usually involves the use of an injection machine incorporating a mould comprising a punch and a die, and at least one nozzle for injection of synthetic material, said process comprising the following steps of:
supplying the mould with films, and
injecting synthetic material into the space, between the punch and the die, existing when the mould is closed.

In the known processes, the mould is supplied with films from a tank containing the pre-cutout films, with the aid of relatively complex mechanisms comprising means for gripping and bringing the films one by one into the mould. Now, this modus operandi presents a certain number of drawbacks. In particular, as a suction device is generally used for gripping the films, two or more films are taken along at the same time in an appreciable percentage of cases, which cannot be separated thereafter. The object may thus be coated with a plurality of layers of films which, of course, is not economically viable. In addition, depending on the type of machine used and/or object to be made, the path that the film must follow between the storage tank and the mould may be relatively complicated, this involving a greater complexity of the film-conducting device, as well as an increased risk of loss of the film during transport thereof.

It is an object of the present invention to overcome these drawbacks and it relates to a process, of the type described hereinabove, in which supply of the mould with films is considerably simplified, whilst ensuring each time that one film only is conducted to the mould before the actual object is manufactured by injection of synthetic material in the mould.

To that end, the process of the invention is noteworthy in that a web of the film material is advanced step by step towards the mould and, after advance of said web by a step corresponding to a certain dimension of the film to be cut out, a film is cut out from said web in the desired format, with the result that the film cut out to the chosen format lies between the punch and the die at the instant when the mould is closed.

In this way, it is certain that the object will be coated, each time, with only one film, whilst avoiding the problems associated with the transport of the film between the heretofore used storage tank and the mould.

According to other features of the invention, the film is cut out from that part of the web lying between the punch and the die; or the film is cut out in that part of the web immediately preceding the mould.

For carrying out the process set forth hereinabove, the present invention also relates to a machine for manufacturing, by injection of synthetic material, objects such as recipients comprising a film forming an integral part thereof and constituting an at least partial coating of said objects, of the type incorporating a mould comprising a punch and a die, and at least one nozzle for injection of synthetic material, and means for supplying the mould with films, said machine being noteworthy in that said means for supplying the mould with films comprise means for advancing a web of the film material step by step towards the mould, and means associated with the mould for cutting out a film to the desired format after advance of said web by a step corresponding to a certain dimension of the film to be cut out, said cut-out means being arranged so that the film cut out to the chosen format lies between the punch and the die at the instant when the mould is closed.

In a first embodiment of the invention, said cut-out means are constituted by the punch adapted to cooperate with a counter-cutter.

In a second embodiment, said cut-out means, comprising at least one cutter arranged transversely to the direction of advance of the web, are disposed immediately before the mould.

In particular, said cut-out means comprise in addition two cutters extending in the longitudinal direction of the web upstream of said transverse cutter, and of which the cross section is adapted to the desired shape of the film.

In a particular application of the invention, the nozzle for injecting synthetic material is borne by the punch and means are provided for maintaining the film against the punch during closure of the mould, comprising at least one sliding block housed in the cavity formed by the die, projecting, in open position of the mould, and adapted to cooperate with the punch in order to maintain the film against the latter during closure of the mould, the slide block being mobile, under the action of the punch, in the direction of advance thereof, against a return force.

According to other features of the invention, the side block comprises a rod of which one end is connected to a means generating the return force, such as a piston adapted to slide in a cylinder provided beyond the cavity of the die, in the direction of advance of the punch, and of which the other end bears a flattened head capable of abutting against the face of the film opposite the die, the axis of the slide block being at least substantially parallel to the direction of advance of the punch and in particular merged with the central axis of the die.

The invention will be more readily understood on reading the following description with reference to the accompanying drawings, in which:

FIGS. 2a to 2e illustrate the different phases of the process of manufacturing an object using the machine of FIG. 1.

FIG. 3 shows a detail of the web of film material.

Figure 1:
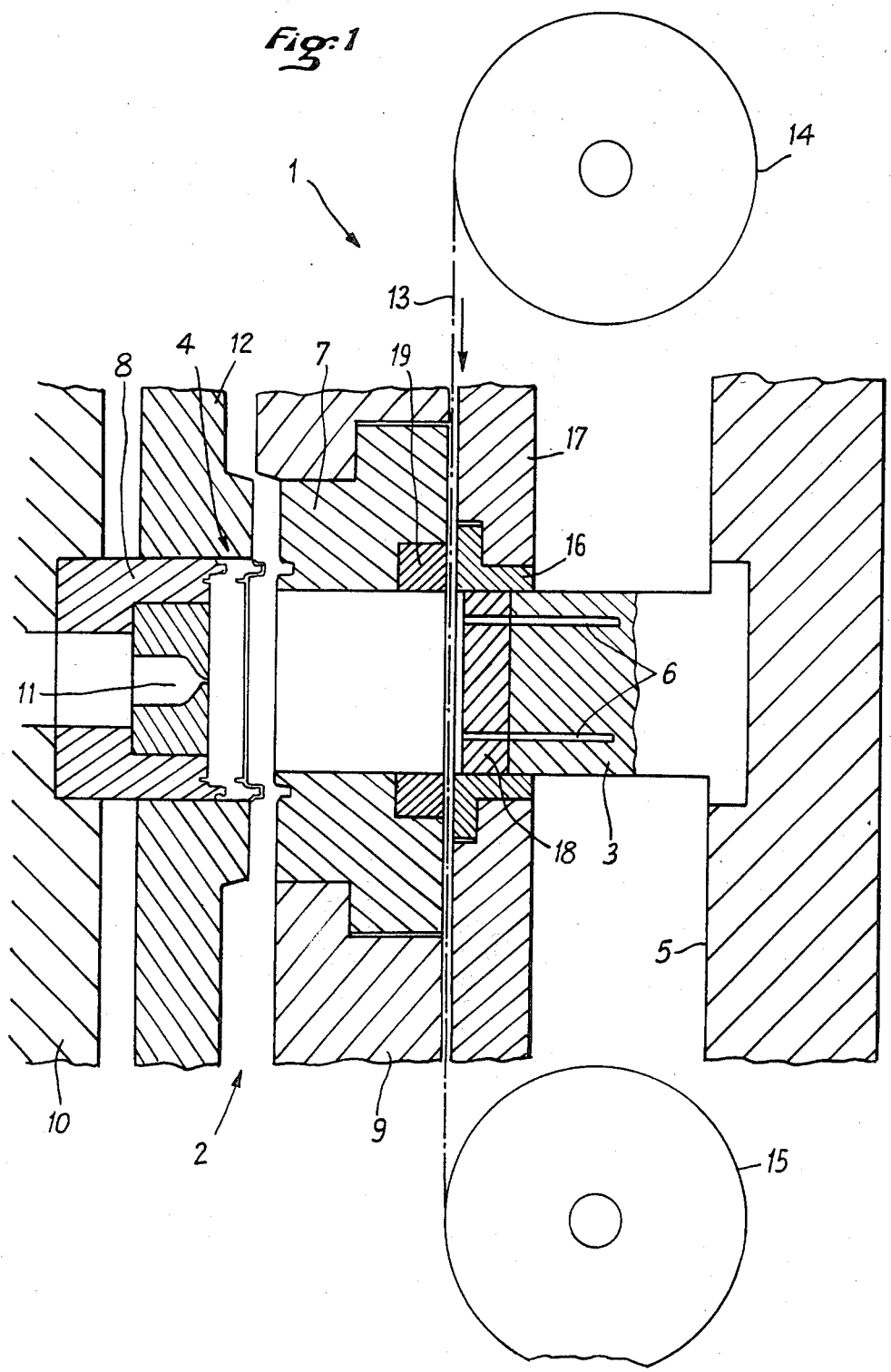
FIG. 1 is a view in section of a first embodiment of a machine for manufacturing objects, by injection of synthetic material, according to the invention, the mould being in open position.

Referring now to the drawings, FIG. 1 shows an embodiment of a machine 1 for manufacturing objects by injection of synthetic material, adapted to make lids of recipients, which incorporates a mould comprising a punch 3 and a die 4.

Punch 3 is mounted on a punch support 5 and is provided with air suction channels 6 whose function will be explained hereinafter. Die 4 is divided into an outer part 7 and an inner part 8. Outer part 7 is mounted on an outer part support 9, and inner part 9 on an inner part support 10. Die 4 is further provided with a nozzle 11 for injection of synthetic material, and an ejector 12 is provided between the outer part 7 and the inner part 8, for evacuating the finished product from the mould.

A web 13 of the film material, unwound from a reel 14 and wound on a reel 15, or vice versa (the reels being driven by conventional means which have not been shown), passes between punch 3 and die 4. More precisely, punch 3 is guided, during its displacement during opening or closure of the mould, by a slide way 16, mounted on a slide way support 17, and in the central recess of the outer part 7.

As may be seen in FIG. 1, the web 13 is in fact guided between, on the one hand, the outer part 7 and its support 9 and, on the other hand, the slide way 16 and its support 17.

In this first embodiment of the invention, the means for cutting the film from the web 13 to the desired format are constituted by the edge 18 of punch 3 which is adapted to cooperate with a counter-cutter 19 borne by the outer part 7 at the end thereof closest to punch 3 when the mould is in open position.

To be complete, it should be noted that the mould is provided with appropriate cooling channels (not shown).

Referring now more particularly to FIGS. 2a to 2e, the operation of this first embodiment of the machine according to the invention will be described hereinafter.

FIG. 2a illustrates, more schematically than FIG. 1, the open position of the mould. In a first phase, the advance movement of punch 3 in the direction of arrow F (FIG. 2b) allows a film 20 to be cut out to the desired format, punch 3 performing the role of cutter cooperating with the counter-cutter 19 (FIG. 1). In the illustrated example where the film is a label which must form an integral part of the lid of a recipient, said label is of substantially rectangular form with rounded angles (FIG. 3). It will be noted that, in this same FIG. 3, the contours of lid 21 to be obtained are shown in chain-dotted lines.

FIG. 2c illustrates the closed position of the mould. During closure of the mould, the film 20 is maintained against the punch 3 by suction of air via channels 6. Once the mould is closed, the injection of synthetic material via injection nozzle 11 may begin (FIG. 2d).

Once moulding is terminated, the mould opens and the finished product 21, comprising a label forming an integral part thereof, may be evacuated from the mould thanks to ejector 12.

When the mould is open, the web 13 of the film material advances by one step corresponding to a certain dimension (in this case the width) of the film to be cut out so that an intact section of web lies against punch 3. As may be seen in FIG. 3, drive of web 13, from reel 15 for example, is possible as non-cutout margins remain in the web.

The cycle described hereinabove may then recommence.

Figure 4:
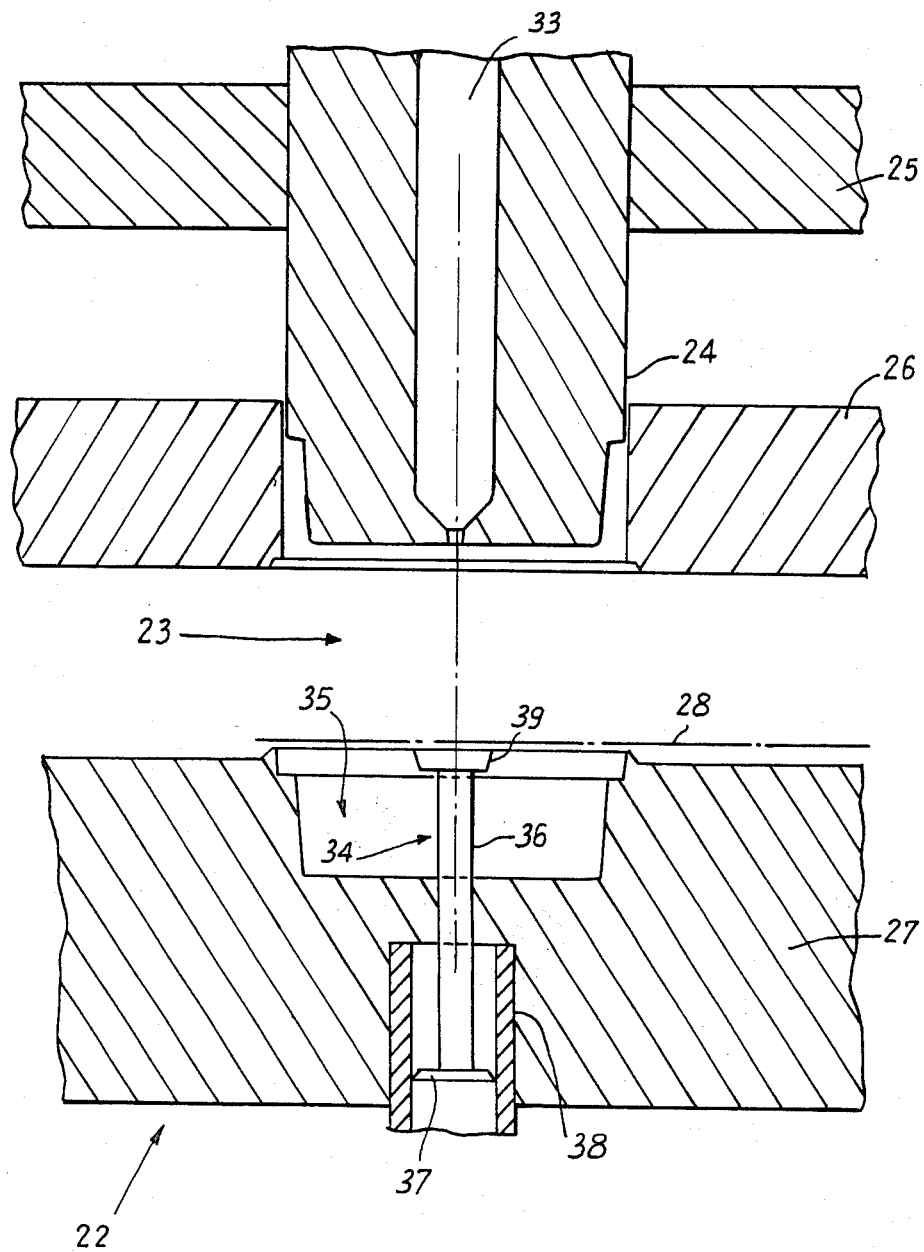
FIG. 4 is a view in section of a second embodiment of a machine for manufacturing objects, by injection of synthetic material, according to the invention, with the mould in open position.
Figure 5:
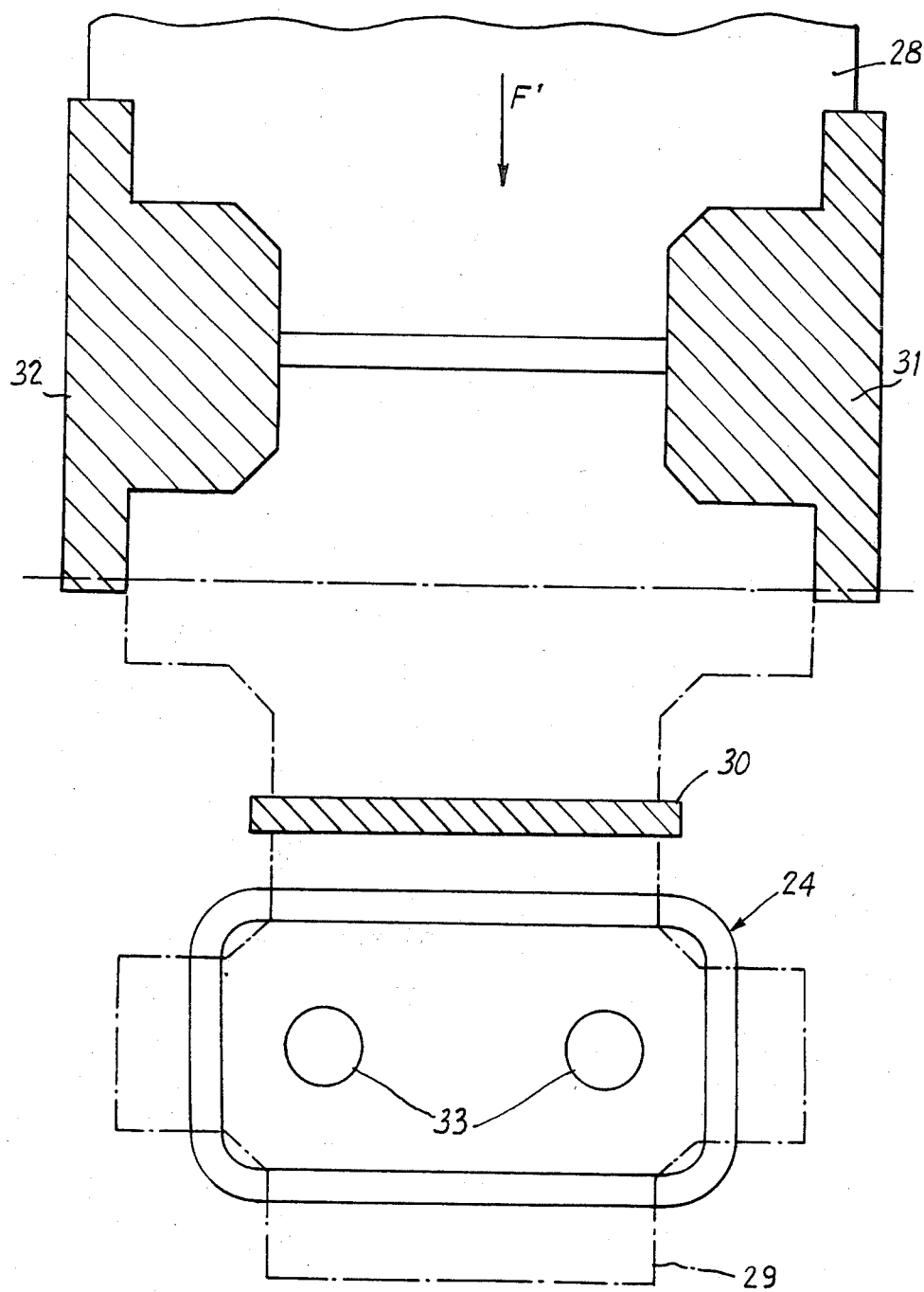
FIG. 5 shows the web of film material as well as the means for cutting out the films, associated with the machine of FIG. 4.

Referring now to FIGS. 4 and 5, a second embodiment of the machine according to the invention will be described hereinafter, adapted in this case to the manufacture of recipients in the form of a boat.

The machine 22 incorporates a mould 23 comprising a punch 24 mounted on a punch support 25 and guided in a slide way 26, and a die 27.

In that case, the web 28 of the film material is conducted, with the aid of any appropriate means such as presser rollers, into the space, between the slide way 26 and the die 27, existing when the mould is open.

As may be seen in FIG. 5, the means for cutting out the film 29 presenting, in this example, the general form of a cross, are disposed immediately before mould 23. The cross shape of the film makes it possible to coat at least partially the four lateral faces and the bottom of the boat-shaped recipient.

The cut-out means comprise a cutter 30 arranged transversely to the direction of advance of the web 28 (arrow F') and, upstream of the transverse cutter 30, two cutters 31, 32 extending in the longitudinal direction of web 28, and of which the cross section is adapted to the desired shape of the film 29.

In this embodiment, the nozzle or nozzles 33 for injecting synthetic material are provided in the punch 24. In addition, means are provided for maintaining the film 29, once cut out, against the punch 24 during closure of the mould. These means comprise a slide block 34 housed in the cavity 35 of the die 27 and comprising a rod 36 of which one end is connected to a piston 37 adapted to slide in a cylinder 38 provided beyond the cavity 35 of the die 27, and of which the other end bears a flattened head 39 capable of coming into abutment against the face of the film opposite the die. It will be noted that the axis of the slide block 34 is at least substantially parallel to the direction of advance of the punch 24 and in particular merged with the central axis of the die.

In this way, the slide block 34, projecting when the mould 23 is in open position, is adapted to cooperate with the punch 24 to maintain the film 29 against the latter during closure of the mould, the slide block being mobile, under the action of the punch, in the direction of advance of the latter, against the return force created by the displacement of piston 37 in cylinder 38.

In that case, cut-out of film 29 to the desired format takes place, in space, in that part of the web 28 immediately preceding the mould and, in time, immediately before and/or during closure of the mould. In a first phase, the longitudinal cutters 31 and 32 pre-shape the film which is then detached from the web by means of the transverse cutter 30, whilst it lies between punch 24 and die 27. During closure of the mould, the film 29 is maintained against the punch 24 as described previously.

Once the mould 23 is closed, synthetic material is injected through the or each nozzle 33 and the film 29 thus forms an integral part of the outer lateral faces and the outer bottom face of the recipient manufactured.

After the mould is opened, the web 28 advances by one step corresponding to the dimension of the film in the longitudinal direction of the web, and the above-described cycle may recommence.

In this second embodiment, it may also be imagined to adapt the punch so as to perform the role of cutter cooperating, in that case, with a counter-cutter provided at the level of slide way 26. Such an adaptation may in particular be envisaged in the event of the film being intended to coat only the bottom of the boat-shaped recipient.

What is claimed is:

1. Process for forming, by injection molding of synthetic material, an object recipient and simultaneously for integrally molding onto the object a label constituting at least a partial coating of said object, by means of an injection machine incorporating a mold comprising a punch and a die, at least one nozzle for injecting synthetic material, and a first cutter which precuts the label shape and a second cutter which slices the web to separate the label from the web, these cutters preceding the mold, the process comprising the following steps of:

advancing a web of the label material step by step towards the mold;

after advance of said web by a step the length of which corresponds to one dimension of the label to be cut out, cutting out a label by means of the first cutter from said web in the desired format in that part of the web immediately preceding the mold, the label not being separated from said web;

further advancing said web with the result that the label cut out to the chosen format lies between the punch and the die at the instant when the mold is closed, and separating said label by means of the second cutter;

injecting synthetic material into the space, between the punch and the die, existing when the mold is closed;

allowing said synthetic material to cool and harden in the mold in order to form said molded object incorporating said label as an integral part thereof; and ejecting the molded object from the mold.

2. Machine for forming, by injection molding of synthetic material, an object recipient and simultaneously for integrally molding onto the object a label constituting at least a partial coating of said object, said machine incorporating:

a mold comprising a punch and a die;

at least one nozzle for injection of synthetic material; and means for supplying the mold with labels, comprising means for advancing a web of the label material step by step towards the mold, and means associated with the mold for cutting out and separating a label to the desired format after advance of said web by a step the length of which corresponds to one dimension of the label to be cut out, said cut-out separation means, comprising at least one cutter which precuts the label shape and at least one cutter arranged transversely to the direction of advance of the web which slices the web to separate the label from the web, being disposed immediately before the mold and being arranged so that the label cut out to the chosen format lies between the punch and the die at the instant when the mold is closed, said cutters preceding the mold.

3. The machine of claim 2 wherein said cut-out means comprises two cutters extending in the longitudinal direction of the web upstream of said transverse cutter, and of which the cross section is adapted to the desired shape of the label.

4. The machine of claim 2 wherein the nozzle for injecting synthetic material is borne by the punch and means are provided for maintaining the label against the punch during closure of the mold, comprising at least one sliding block housed in the cavity formed by the die, projecting, in open position of the mold, and adapted to cooperate with the punch in order to maintain the label against the latter during closure of the mold, the slide block being mobile, under the action of the punch, in the direction of advance thereof, against a return force.

5. The machine of claim 4 wherein the slide block comprises a rod of which one end is connected to a means generating the return force, comprising a piston adapted to slide in a cylinder provided beyond the cavity of the die, in the direction of advance of the punch, and of which the other end bears a flattened head capable of abutting against the face of the label opposite the die.

6. The machine of claim 4 wherein the axis of the slide block is at least substantially parallel to the direction of advance of the punch and in particular merged with the central axis of the die.

* * * * *